United States Patent
Kishore et al.

(10) Patent No.: US 9,118,697 B1
(45) Date of Patent: Aug. 25, 2015

(54) SYSTEM AND METHOD FOR INTEGRATING NAMESPACE MANAGEMENT AND STORAGE MANAGEMENT IN A STORAGE SYSTEM ENVIRONMENT

(75) Inventors: K. Uday Kishore, Sunnyvale, CA (US); Shankar Balasubramanian, Sunnyvale, CA (US); Konstantinos Roussos, Sunnyvale, CA (US); Brian M. Hackworth, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 2083 days.

(21) Appl. No.: 11/384,711

(22) Filed: Mar. 20, 2006

(51) Int. Cl.
*G06F 15/173* (2006.01)
*H04L 29/08* (2006.01)
*G06F 17/30* (2006.01)

(52) U.S. Cl.
CPC .......... *H04L 67/1097* (2013.01); *G06F 17/302* (2013.01)

(58) Field of Classification Search
CPC .................... H04L 67/1097; G06F 17/302
USPC ............. 707/10, 100, 200–206; 709/223, 229
See application file for complete search history.

(56) References Cited

U.S. PATENT DOCUMENTS

| | | | |
|---|---|---|---|
| 5,689,701 A | 11/1997 | Ault et al. | |
| 5,742,806 A | 4/1998 | Reiner et al. | |
| 6,061,743 A | 5/2000 | Thatcher et al. | |
| 6,438,600 B1 | 8/2002 | Greenfield et al. | |
| 6,567,808 B1 * | 5/2003 | Eschelbeck et al. | 707/10 |
| 6,721,777 B1 | 4/2004 | Sharma | |
| 7,082,600 B1 | 7/2006 | Rau et al. | |
| 7,210,131 B2 | 4/2007 | Schmidt et al. | |
| 7,313,560 B2 | 12/2007 | Dilley et al. | |
| 7,337,197 B2 | 2/2008 | Wilson et al. | |
| 2002/0010783 A1 | 1/2002 | Primak et al. | |
| 2002/0116454 A1 | 8/2002 | Dyla et al. | |
| 2002/0147696 A1 | 10/2002 | Acker et al. | |
| 2002/0156879 A1 * | 10/2002 | Delany et al. | 709/223 |
| 2002/0156932 A1 | 10/2002 | Schneiderman | |
| 2003/0033240 A1 | 2/2003 | Balson et al. | |
| 2003/0195870 A1 | 10/2003 | Newcombe et al. | |
| 2004/0059808 A1 * | 3/2004 | Galloway et al. | 709/224 |
| 2004/0078397 A1 | 4/2004 | Mehta et al. | |
| 2004/0122917 A1 | 6/2004 | Menon et al. | |
| 2004/0267830 A1 | 12/2004 | Wong et al. | |
| 2005/0015761 A1 | 1/2005 | Chang et al. | |
| 2005/0044423 A1 | 2/2005 | Mellmer et al. | |
| 2005/0060281 A1 * | 3/2005 | Bucher et al. | 707/1 |

(Continued)

OTHER PUBLICATIONS

Balasubramanian et al., System and Method for Data Migration Management in a Logical Namespace of a Storage System Environment, U.S. Appl. No. 11/384,776, filed Mar. 20, 2006, 37 pages.

(Continued)

*Primary Examiner* — Kevin Mai
(74) *Attorney, Agent, or Firm* — Cesari and McKenna, LLP

(57) ABSTRACT

A system and method integrates namespace management and storage management in a storage system environment. According to the invention, an integrated management framework provides an underlying infrastructure that supports various heterogenous storage access protocols within a single, logical namespace service. The logical namespace service is based on extensions to underlying storage management processes that cooperate to create the integrated management framework. Notably, these extensions are embodied as novel library functionality.

21 Claims, 8 Drawing Sheets

(56) References Cited

U.S. PATENT DOCUMENTS

| | | | |
|---|---|---|---|
| 2005/0091098 A1* | 4/2005 | Brodersen et al. | 705/8 |
| 2005/0091640 A1* | 4/2005 | McCollum et al. | 717/117 |
| 2005/0125503 A1 | 6/2005 | Iyengar et al. | |
| 2005/0154731 A1 | 7/2005 | Ito et al. | |
| 2005/0210033 A1 | 9/2005 | Newcombe et al. | |
| 2005/0210074 A1 | 9/2005 | Nakatani et al. | |
| 2005/0240654 A1 | 10/2005 | Wolber et al. | |
| 2006/0036570 A1 | 2/2006 | Schaefer et al. | |
| 2006/0122955 A1 | 6/2006 | Bethlehem et al. | |
| 2006/0123062 A1 | 6/2006 | Bobbitt et al. | |
| 2006/0143608 A1 | 6/2006 | Dostert et al. | |
| 2007/0038697 A1* | 2/2007 | Zimran et al. | 709/203 |
| 2007/0055703 A1 | 3/2007 | Zimran et al. | |
| 2007/0088702 A1* | 4/2007 | Fridella et al. | 707/10 |
| 2007/0198458 A1 | 8/2007 | Pudipeddi | |

OTHER PUBLICATIONS

DCE 1.2.2 DFS Administration Guide and Reference, 1997, published by The Open Group, 1997, 1187 pages.

DataFabric® Manager 3.2 Administration Guide, 1994-2004, published by Network Appliance, Inc., Sep. 2005, 564 pages.

Kishore et al., System and Method for Integrating Namespace Management and Storage Management in a Storage System Environment, U.S. Appl. No. 11/384,711, filed Mar. 20, 2006, 41 pages.

VFM™ (Virtual File Manager) Reference Guide, Version 3.0, 2001-2003, 197 pages.

VFM™ (Virtual File Manager) Getting Started Guide, Version 3.0, 2001-2003, 62 pages.

Balasubramanian et al., Migration Engine for Use in a Logical Namespace of a Storage System Environment, U.S. Appl. No. 11/384,804, filed Mar. 20, 2006, 38 pages.

Moons, Herman et al., *Location-Independent Object Invocation in Open Distributed Systems*, Autumn 1991 EurOpen Technical Conference and Exhibition, pp. 287-300 (Sep. 16-20, 1991).

Pitt et al., Java.rmi The Remote Method Invocation uide, Jul. 18, 2001, Addison Wesley, Chapters 6 & 13.

Fischer, JNDI Unleashed, May 29, 2000, Quantum Enterprise Solutions, Inc.

Sun Microsystems, RMI Registry Service Provider for the Java Naming and Directory Interface (JNDI), 2001, Sun Microsystems.

Farley et al., Java Enterprise in a Nutshell, $3^{rd}$ Edition, Nov. 22, 2005.

Sun Microsystems, JNDI Service Providers, Jun. 4, 2004, Sun Microsystems.

Perrone et al., Java Naming and Directory Service Interfaces, Oct. 1999, Assured Technologies, Inc.

Sun Microsystems, The JNDI Tutorial, 2003, Sun Microsystems.

Sun Microsystems, JNDI Naming & Directory Interface, May 2005, Sun Microsystems.

Grosso, Java RMI, Oct. 29, 2001, Oreilly, Chapter 15.

Arnold et al., The Java Programming Language Second Edition, 1998, Addison Wesley, Chapter 1, 2, 9, 10, 15, 17.

U.S. Appl. No. 11/414,593 entitled Namespace and Storage Management Application Infrastructure for Use in Management of Resources in a Storage System Environment, filed Apr. 28, 2006 by Stevem Klinkner.

\* cited by examiner

SYSTEM AND METHOD FOR INTEGRATING NAMESPACE MANAGEMENT AND STORAGE MANAGEMENT IN A STORAGE SYSTEM ENVIRONMENT

FIELD OF THE INVENTION

The present invention relates to storage systems, and more specifically, to a logical namespace service configured to facilitate namespace and storage management in a storage system environment.

BACKGROUND OF THE INVENTION

A storage system typically comprises one or more storage devices into which information may be entered, and from which information may be obtained, as desired. The storage system includes an operating system that functionally organizes the system by, inter alia, invoking storage operations in support of a storage service implemented by the system. The storage system generally provides its storage services through the execution of software modules, such as processes. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage system may be further configured to operate according to a client/server model of information delivery to thereby allow many clients to access information stored on the system. In this model, the storage system may be embodied as file server executing an operating system, such as the Microsoft® Windows™ operating system (hereinafter "Windows operating system"). Furthermore, the client may comprise an application executing on an operating system of a computer that "connects" to the server over a computer network, such as a point-to-point link, shared local area network, wide area network, or virtual private network implemented over a public network, such as the Internet. Each client may request the services of the server by issuing storage access protocol messages (in the form of packets) to the server over the network. By supporting a plurality of storage (e.g., file-based) access protocols, such as the conventional Common Internet File System (CIFS) and the Network File System (NFS) protocols, the utility of the server is enhanced.

To facilitate client access to the information stored on the server, the Windows operating system typically exports units of storage, e.g., (CIFS) shares. As used herein, a share is equivalent to a mount point or shared storage resource, such as a folder or directory that stores information about files or other directories served by the file server. A Windows client may access information in the directory by mounting the share and issuing a CIFS protocol access request that specifies a uniform naming convention (UNC) path to the share. The UNC path or pathname is an aspect of a Windows networking environment that defines a way for a client to refer to a unit of storage on a server. The UNC pathname is prefixed with the string ll to indicate resource names on a network. For example, a UNC pathname may comprise a server name, a share (directory) name and a path descriptor that collectively reference a unit of storage or share. Thus, in order to access the share, the client typically requires knowledge of the specific physical location (i.e., the identity) of the server exporting the share.

Instead of requiring the client to provide the specific identity of the file server exporting the share, it is desirable to only require a logical pathname to the share. That is, it is desirable to provide the client with a globally unique pathname to the share without reference to the file server. The conventional Distributed File System (DFS) namespace service provides such a solution in a Windows environment through the creation of a namespace that removes the specificity of server identity. DFS is well-known and described in DCE 1.2.2 *DFS Administration Guide and Reference*, 1997, which is hereby incorporated by reference. As used herein, a namespace is a view of shared storage resources (such as shares) from the perspective of a client. The DFS namespace service is generally implemented using one or more DFS servers and distributed components in a network.

Using the DFS service, it is possible to create a unique pathname (in the form of a UNC pathname) for a storage resource that a DFS server translates to an actual location of the resource (share) in the network. However, in addition to the DFS namespace provided by the Windows operating system, there are many other namespace services provided by various operating system platforms, including the NFS namespace provided by the conventional Unix® operating system. Each service constructs a namespace to facilitate management of information using a layer of indirection between a file server and client accessing a shared storage resource (share) on the server. For example, a share may be connected or "linked" to a link point (link in DFS terminology or a mount point in NFS terminology) to hide the machine specific reference to the share. By referencing the link point, the client can automatically access information on the storage resource of the specific machine. This allows an administrator (user) to store the information on any server in the network by merely providing a reference to the information (or share). However, these namespaces are typically services created on heterogeneous server platforms, which leads to incompatibility and non-interoperability with respect to management of the namespaces by the user. For example, the DFS namespace service is generally limited to Windows-based operating system platforms, whereas the NFS namespace service is generally limited to Unix-based operating system platforms.

The Virtual File Manager (VFM™) developed by NuView, Inc. and available from Network Appliance, Inc., ("NetApp") provides a namespace service that supports various protocols operating on various file server platforms, such as NetApp filers and DFS servers. The VFM namespace service is well-known and described in *VFM™ (Virtual File Manager) Reference Guide, Version* 4.0, 2001-2003, and *VFM™ (Virtual File Manager) Getting Started Guide, Version* 4.0, 2001-2003. Broadly stated, the VFM namespace service facilitates management of information on shared storage resources (i.e., namespace management) in a heterogeneous platform environment. However, the VFM service does not truly facilitate management of the storage resources on storage devices adapted to provide the information (i.e., storage management). In particular, with respect to control (i.e., creation and scheduling) of storage resources on storage devices of, e.g., NetApp filers, the VFM service can merely use existing storage resources.

Thus, there is a need for a namespace service that allows a user to manage differs ent namespaces provided by storage systems, such as servers, in a computer network. In addition, there is a need for a namespace service that facilitates namespace management, as well as storage management, among servers in the computer network.

SUMMARY OF THE INVENTION

The disadvantages of the prior art are overcome by providing a system and method for integrating namespace management and storage management in a storage system environment. According to the invention, an integrated management framework includes an underlying infrastructure that supports various heterogeneous storage access protocols within a single, logical namespace service. In addition, the logical namespace service enables integration of storage management, i.e., the function of managing individual storage objects, with namespace (data) management, i.e., the function of managing individual namespace objects, to thereby improve the performance and availability of the service. The logical namespace service is based on extensions to underlying storage management processes that cooperate to create the integrated management framework. Notably, these extensions are embodied as novel library functionality.

Specifically, the integrated management framework facilitates configuration and management of pathnames in the logical namespace. That is, the underlying infrastructure of the framework allows a user to manage various pathnames exported by heterogeneous namespace service and protocol implementations within the logical namespace. This aspect of the framework involves creation of a layer of abstraction that presents to a client a notion of the logical namespace that is accessible via a particular storage access protocol. To that end, the integrated framework extracts logical "views" (e.g., pathnames) from the namespaces exported by the heterogeneous services, stores those pathnames, and then configures the pathnames so that they are accessible in the logical namespace via the storage access protocol.

In accordance with an aspect of the present invention, the underlying storage management processes are further extended to provide a novel policy architecture directed to the ability to integrate namespace and storage management in the logical namespace. The policy architecture illustratively comprises a policy, a task and a job. As used herein, a policy is a static entity that comprises rules for performing a specific action, e.g., configuration of pathnames in the logical namespace. A task is a static entity that comprises parameters needed to execute the policy, whereas a job is an executable entity or an executing instance of the task. Advantageously, each entity of the policy architecture is independent of the other, which allows increased flexibility and efficiency among tasks and jobs, particularly with respect to minor changes to a policy.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage System Environment

Figure 1:
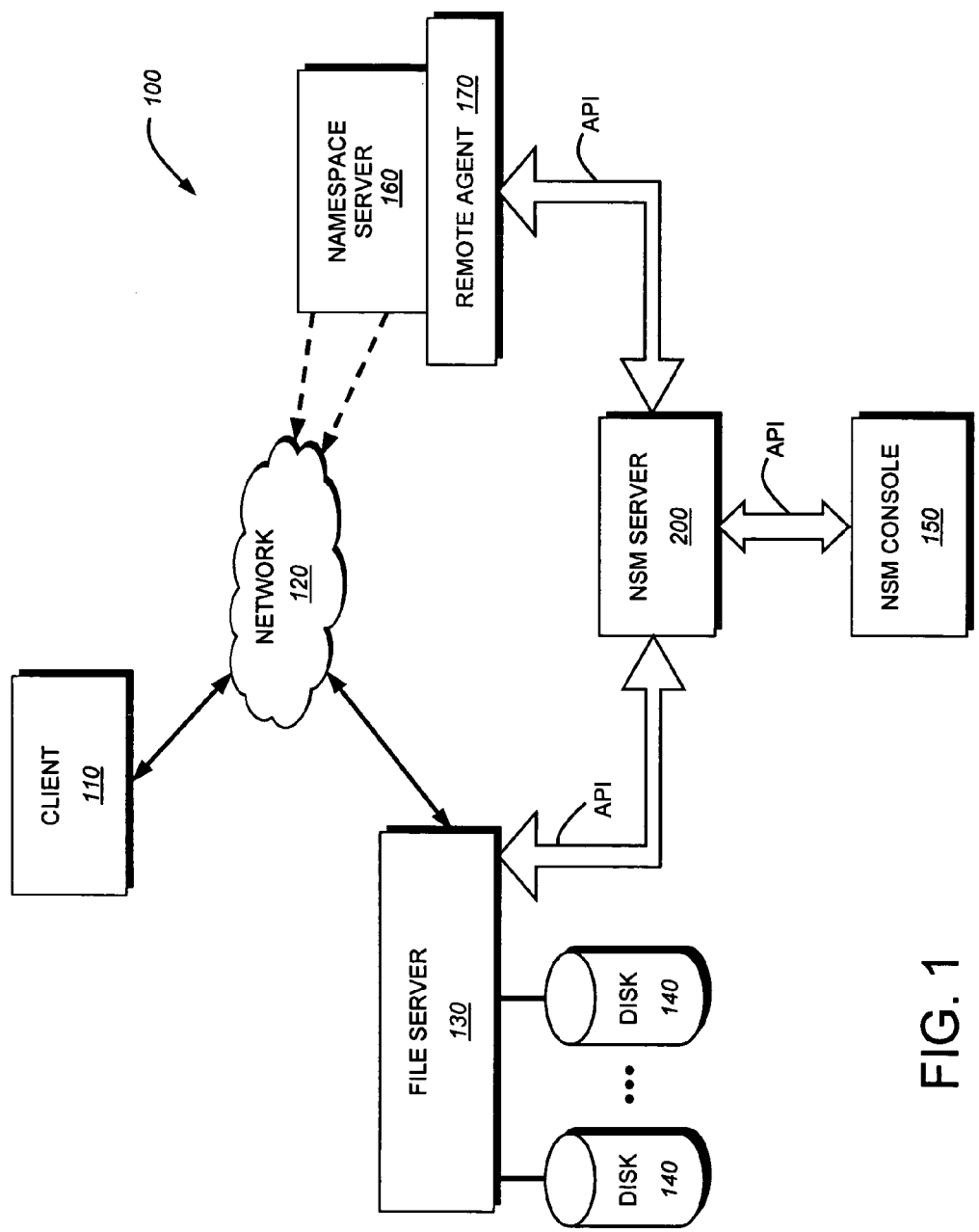
FIG. 1 is a schematic block diagram of an exemplary storage system environment that may be advantageously used with the present invention.

FIG. 1 is a schematic block diagram of an exemplary storage system environment 100 that may be advantageously used with the present invention. The storage system environment comprises a plurality of storage systems configured to provide storage services relating to information stored on storage devices, such as disks 140. The storage systems include file servers 130 executing operating systems such as, e.g., the Microsoft® Windows™ operating system (hereinafter "Windows operating system"), the Unix® operating system and the NetApp® Data ONTAP® operating system available from Network Appliance, Inc., Sunnyvale, Calif. One or more clients 110 may connect to the file servers over a computer network 120, such as a point-to-point link, shared local area network, wide area network, or virtual private network implemented over a public network, such as the Internet.

Each client 110 may comprise an application executing on an operating system of a general-purpose computer that interacts with the file servers 130 in accordance with a client/server model of information delivery. That is, the client may request the services of a server, and the server may return the results of the services requested by the client, by exchanging packets over the network 120. The client may issue packets including storage (e.g., file-based) access protocols, such as the Common Internet File System (CIFS) protocol or Network File System (NFS) protocol, over the Transmission Control Protocol/Internet Protocol (TCP/IP) when accessing information in the form of, e.g., files and directories.

To facilitate client access to the information stored on the server, a file server 130 executing, e.g., the Windows operating system typically exports units of storage, e.g., (CIFS) shares. A client 110 may access information of the share by mounting the share and issuing a CIFS protocol access request that specifies a uniform naming convention (UNC) path to the share. Although the illustrative embodiment is directed to a Windows file server that is accessed using the CIFS protocol, the invention described herein is not so limited and may also apply to other servers 130, such as Unix filer servers and NetApp filers, that are accessible using other file access protocols, such as the NFS protocol. The client connects to file server 130 when accessing the share, typically by specifying the IP address (or identity) of the file server.

However, instead of requiring that the client know the specific identity of the server in order to access the share, a namespace server 160, such as the conventional Distributed File System (DFS) server, provides a namespace service that removes the specificity of server identity. Using the DFS service, a unique pathname (in the form of a UNC pathname) is created for the share that the DFS server translates to an actual location of the share in the network. For example, assume a client application issues a CIFS request to access information of a share stored on a file server 130 in the environment 100. The request is passed through various layers of the client's operating system including, e.g., a CIFS redirector. Before issuing a CIFS packet directed to a UNC pathname specified by the client application, the redirector contacts the DFS server to determine whether there is a different, actual pathname needed to access the information. If so, the DFS server returns that actual pathname to the redirector, which then uses that pathname to create the CIFS packet for transmission over the network. The DFS namespace service thus provides a level of indirection to a share that resides on a file server 130 in the environment 100.

Although the illustrative embodiment is directed to a DFS namespace service provided by the Windows operating system executing on a DFS server, the invention described herein is not limited and may also apply to other namespace services, such as the NFS namespace provided by the Unix operating system executing on a conventional Name Information Service (NIS) server. Each service constructs a namespace to facilitate management of information using a layer of indirection between a file server 130 and client 110 accessing a shared storage resource (share) on the server. However, these namespace services are created on heterogeneous server platforms, which lead to incompatibility and non-interoperability with respect to management of different namespaces by, e.g., an administrator (user).

In accordance with the invention, a namespace and storage management (NSM) server 200 is provided that integrates namespace management and storage management in storage system environment 100. The NSM server 200 includes an integrated management framework that provides an underlying infrastructure that supports various heterogeneous storage access protocols within a single, logical namespace service. To that end, the NSM server cooperates with a NSM console 150 and a remote agent 170 to create the integrated management framework. As described herein, the integrated management framework, in turn, allows the NSM server 200 to interact with any namespace server, such as a DFS server configured to handle CIFS protocol requests or a NIS server configured to handle NFS protocol requests, directed to namespace services.

Figure 2:
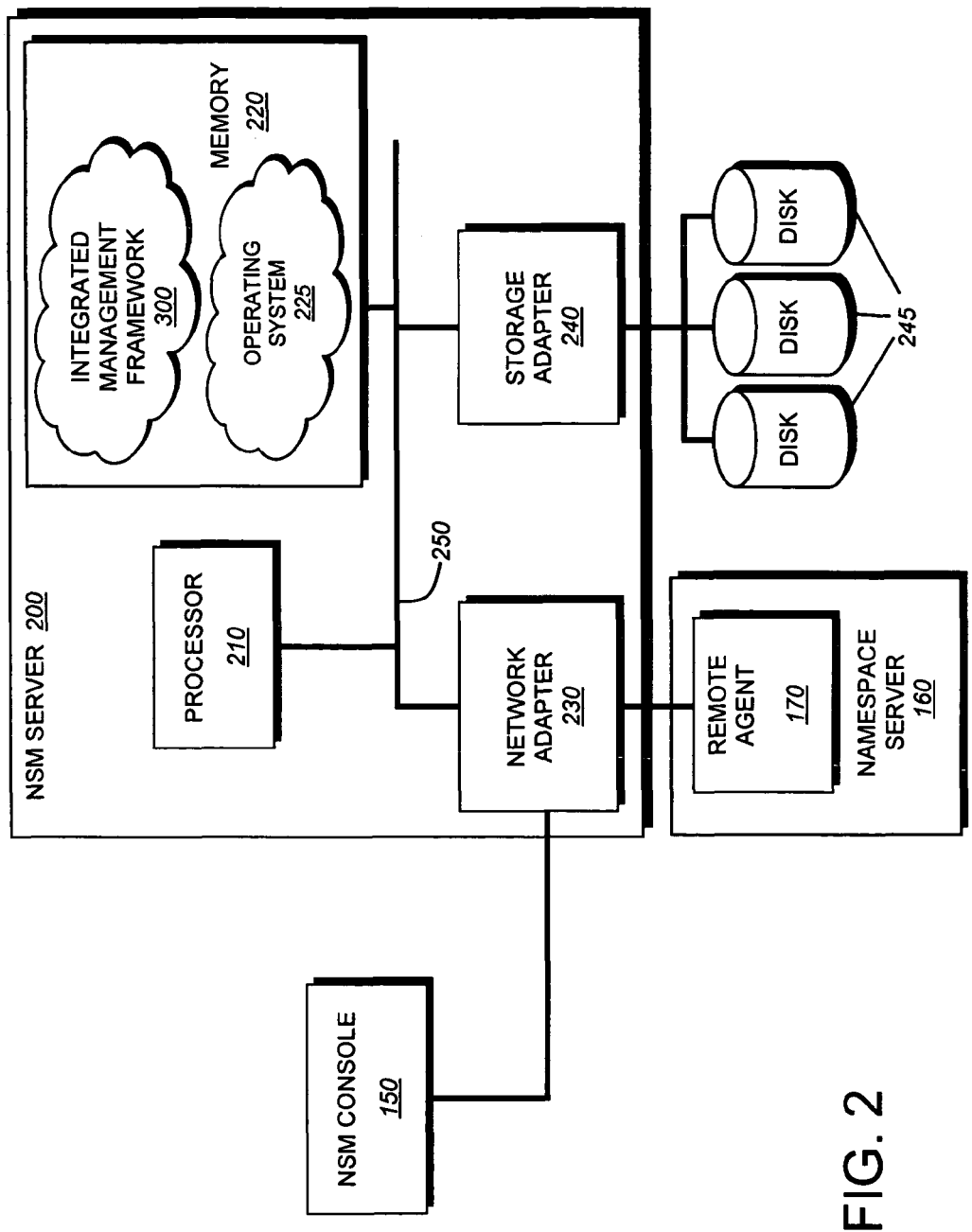
FIG. 2 is a schematic block diagram of an exemplary namespace and storage management server that may be advantageously used with the present invention.

FIG. 2 is a schematic block diagram of an exemplary namespace and storage management (NSM) server 200 that may be advantageously used with the present invention. The NSM server illustratively comprises a processor 210, a memory 220, a network adapter 230 and a storage adapter 240 interconnected by a system bus 250. The memory 220 may comprise storage locations addressable by the processor and adapters for storing software programs, i.e., specific sets of ordered operations, and data structures associated with the invention. The processor and adapters may, in turn, comprise processing elements and/or logic circuitry configured to execute the programs and manipulate the data structures. In particular, the storage adapter 240 comprises the mechanical, electrical and signaling circuitry needed to connect the server to storage devices, such as disks 245. Similarly, the network adapter 230 comprises the mechanical, electrical and signaling circuitry needed to connect the server 200 to, e.g., the NSM console 150 and remote agent 170.

An operating system 225, portions of which is typically resident in memory 220 and executed by the processing elements, functionally organizes the server by, inter alia, invoking operations in support of storage services implemented by the server. In the illustrative embodiment, the operating system is preferably the Windows operating system, although it is expressly contemplated that any appropriate operating system, such as the Unix operating system, may be enhanced for use in accordance with the inventive principles described herein. The operations invoked by the operating system are illustratively namespace and storage operations in support of an integrated management framework 300 provided by the server. It will be apparent to those skilled in the art that other processor and memory means, including various computer readable media, may be used for storing and executing program instructions pertaining to the invention described herein.

B. Integrated Management Framework

Figure 3:
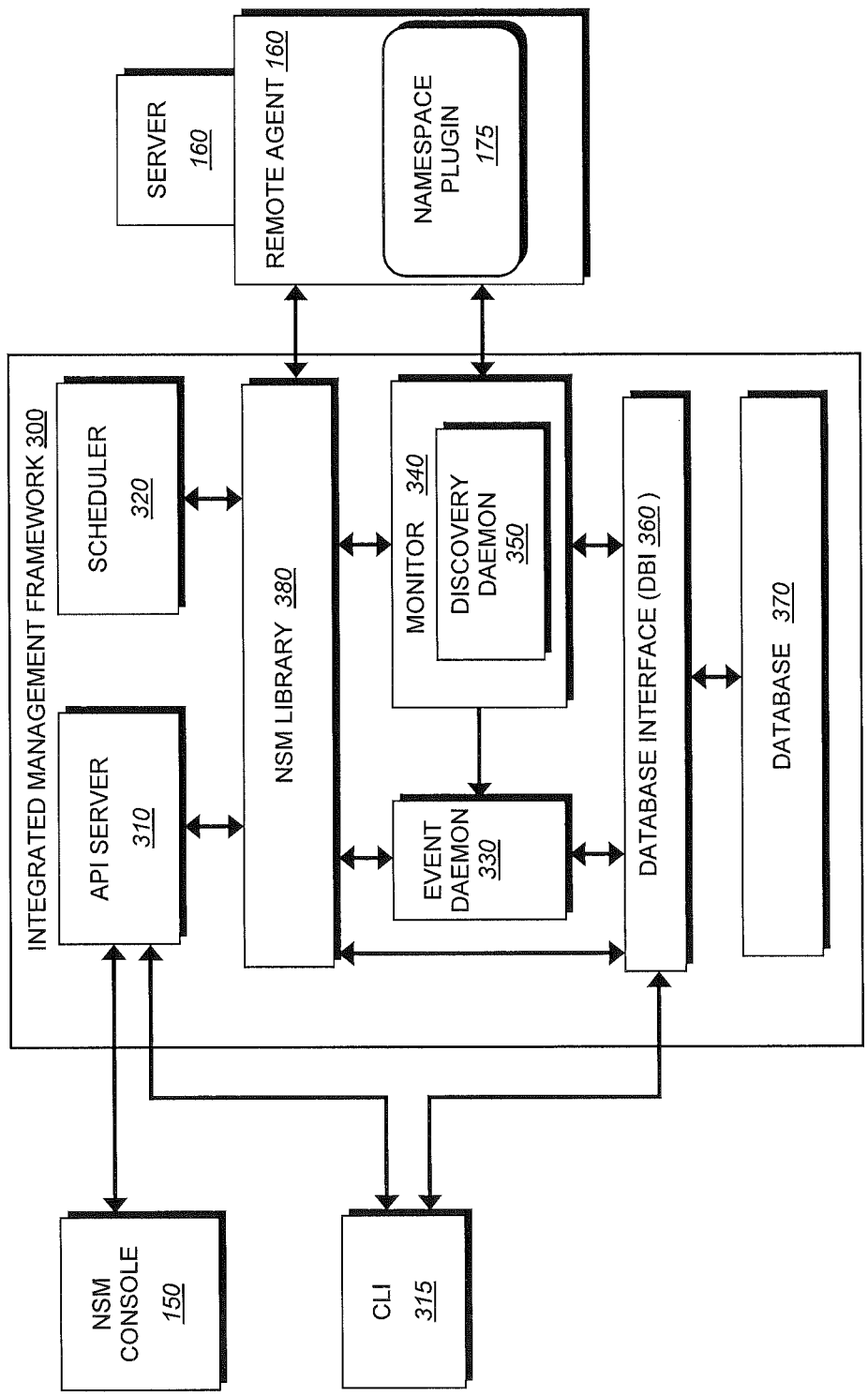
FIG. 3 is a schematic block diagram of an integrated management framework in accordance with the present invention.

The NSM server 200 generally provides its storage services through the execution of software modules, such as processes. These services are illustratively implemented as separately-scheduled processes (and/or daemons) that execute in user space of operating system 225 to provide the integrated management framework 300. As used herein, a process refers to an instance of a program being executed by, e.g., the processor and a thread is an instance of a sequence of the process's program code. FIG. 3 is a schematic block diagram of the integrated management framework 300 in accordance with the present invention. The integrated management framework 300 provides a logical namespace service that is based on extensions to underlying storage management technology and other technological components. Notably, these extensions are embodied as novel library functionality.

In the illustrative embodiment, the underlying storage management technology is embodied as DataFabric® Manager (DFM) technology available from Network Appliance, Inc., Sunnyvale, Calif. and described in *DataFabric® Manager* 3.2 *Administration Guide,* 1994-2004, which is hereby incorporated by reference. Broadly stated, the DFM technology comprises a set of coordinating processes, including an application programming interface (API) server 310, a scheduler 320, an Event daemon 330, a Monitor 340 including a Discovery daemon 350 and a database interface (DBI) 360 configured to interact with an embedded database 370. The present invention extends the capabilities of these processes to create the integrated namespace and storage management framework 300 through the addition of NSM library functionality 380. As described herein, the NSM library 380 is illustratively implemented as various library modules, each of which provides namespace and storage management actions embodied as APIs.

The integrated management framework 300 exposes a set of interfaces, e.g., an API interface that is used by the NSM console 150 and a command line interface (CLI 315), used by a communication protocol. Illustratively, the communication protocol is embodied as an XML over HTTP mechanism for APIs, primarily because of its ability to describe data conveyed over the network, as well as the transport, without describing the actual storage access protocol. Such a protocol is also easily extensible and flexibly agnostic to binary formats of specific servers and clients to thereby operate efficiently in a heterogeneous environment.

In the illustrative embodiment, the integrated management framework 300 facilitates configuration and management of pathnames in the logical namespace. That is, the underlying infrastructure of the framework allows a user to manage various pathnames exported by heterogeneous namespace service and protocol implementations within the logical namespace. This aspect of the framework involves creation of a layer of abstraction that presents to a client a notion of the logical namespace that is accessible via a particular storage access protocol. As noted, the various heterogeneous namespace services are not interoperable with respect to user management; the integrated framework 300, as described further herein, extracts logical "views" (e.g., pathnames) from the namespaces exported by the heterogeneous services, stores those pathnames in database 370, and then configures the pathnames so that they are accessible in the logical namespace via the storage access protocol.

In storage and networking environments, some operations can only be executed if a user (such as a system administrator) is logged into a server on which the operations are to be performed, e.g., the NSM server. In other words, a remote operation that is to be invoked on the server 200 can only be performed if the user is logged into the server. The NSM console 150 and remote agent 170 of the integrated management framework 300 address this problem. Illustratively, the NSM console 150 is a component of the framework that includes a JAVA-based interface and the remote agent 170 is a software module installed on a host machine, such as a server 160, which manages a particular namespace, e.g., a DFS server. Using the communication protocol, the NSM console issues APIs to the NSM server which, in turn, issues APIs that are invoked on the remote agent to perform actions requested by the user.

Essentially, the remote agent 170 is a thin web server that includes "programmatic glue" to enable installation of plug-in modules ("plug-ins"). An example of a plug-in is a namespace management module 175 that allows remote access and management of data (e.g., pathnames) by the NSM server 200. Notwithstanding the particular namespace, the integrated management framework 300 involves installation of a remote agent 170 on a server 160 that manages the particular namespace and interacts with the NSM server 200 via APIs expose by the remote agent.

Illustratively, the remote agent 170 is installed on a machine that hosts a DFS server of a Windows/DFS environment. The namespace management plug-in module 175 may, in turn, be installed on the remote agent to enable communication with the NSM server 200 when accessing namespace information stored on the DFS server. Specifically, the NSM server issues APIs in connection with the communication protocol to instruct the remote agent 170 to perform certain actions. For example, in order to construct or change pathnames in the logical namespace, a user interacts with the NSM console 150 to access that namespace by, in effect, invoking a set of APIs on the NSM server 200 which, in turn, invokes a set of APIs on the remote agent 170. Once the NSM server has cooperated with the DFS server to construct the pathnames, those servers are no longer involved in client data accesses.

It should be noted that the underlying directory data structures used in the logical namespace of the present invention reside on the namespace server 160 providing the particular namespace service, such as a DFS server. That is, the namespace server 160 implements the basic namespace; the NSM server 200 provides a service for configuring that namespace. To that end, the NSM server 200 cooperates with the remote agent 170 to acquire a copy of the namespace directory structures from the namespace server 160 and stores the copy on the embedded database 370. The NSM server then cooperates with the NSM console 150 to allow a user to manipulate (configure) the copy. Once configuration is complete, the server 200 cooperates with the remote agent to "push" (store) the manipulated copy of directory structures back to the namespace server 160.

The Monitor 340 is illustratively embodied as a multi-threaded process having a collection of individual monitor threads, each of which is scheduled by the scheduler 320. The Monitor 340 cooperates with the remote agent 170 to communicate with one or more machines/devices in the storage system environment 100 (using SNMP, RSH, etc) to collect any type of storage or data/namespace object information (e.g., volume and/or qtree information, as well as information about namespace servers) available in the environment and, to that end, functions as a data collector. Illustratively, each monitor thread is configured to collect information about a particular object in the environment. Extensions to the Monitor described herein are directed to namespace and agent management; each of which is illustratively embodied as an individual monitor thread.

As data is collected, the Monitor 340 determines whether it needs to notify any processes of some resulting condition. For example, an individual monitor thread may detect a threshold and the occurrence of some type of event. As used herein, an event is a synchronous notification with a severity attribute. By configuring thresholds, the NSM server 200 can determine when an event occurs. An example of a threshold is "if volume capacity is greater than 50%, generate an event, out-of-space". If a threshold is exceeded, the Monitor 340 communicates with the Event daemon 330 to notify it of that event. Thus, the Monitor 340 is configured to detect certain events and, in response, generate event notifications to the Event daemon 330. The Event daemon 330 then determines what (if any) further action is needed (e.g., send an SMTP alert, an email, an SNMP trap) and records the event in the embedded database 370.

The embedded database 370 is illustratively implemented as a Sybase relational database that exports a set of Simple Query Language (SQL) function calls that enable storage/retrieval of data, such as namespace objects, to/from the database. As described herein, a schema of the database is configured to efficiently capture characteristics of a namespace independent of the storage access protocol, such as NFS or CIFS. The database 370 is illustratively organized as a plurality of tables, each of which can be accessed by processes within the NSM server. The DBI 360 is illustratively embodied as a SQL interface to the database and its associated tables, although it will be understood to those skilled in the art that the DBI may be embodied as any other type of database protocol interface depending on the actual implementation of the database, e.g., an Oracle database.

The API server 310 is illustratively embodied as a multi-threaded process that is configured to implement the APIs used by the NSM console 150 to access the database 370 and manipulate information stored thereon. The API server 310 also implements the communication protocol APIs used to interact with the remote agent 170. Accordingly, extensions to the API server 310 are primarily directed to those APIs required to manipulate the database and the remote agent. For example, APIs are invoked by a user (via the NSM console 150) to manipulate (modify, update) the embedded database 370. The API server 310 updates the database with respect to user configuration requests and the Monitor 340 periodically queries (polls) the database for any state/information change. Depending upon the change, the API server may cooperate with the Monitor to instruct data collection from the remote agent 170. After receiving the collected information from the remote agent, the Monitor 340 updates the database and the Event daemon 330.

C. Policy Architecture

One of the underlying storage management services provided by the coordinating processes is script management, which involves the execution of a script according to a schedule. In accordance with an aspect of the present invention, the capabilities of these processes are further extended to provide an enhancement to script management that forms the basis of a novel policy architecture directed to, e.g., the ability to integrate namespace and storage management in the logical namespace. Illustratively, the processes of the integrated management framework 300 that implement the policy architecture include, among others, (i) the Monitor 340 and its notion of thresholds and (ii) the scheduler 320, which defines the periods at which the Monitor and a script, e.g., a piece of code that runs other code, execute. In essence, the "policy engine" of the integrated management framework is embodied as the ability of the NSM server 200 to schedule scripts that perform a set of operations.

In the illustrative embodiment, the policy architecture comprises a policy, a task and a job. As used herein, a policy is a static entity that comprises rules for performing a specific action, e.g., configuration of pathnames in the logical namespace or discovery of file servers in the storage system environment. A task is a static entity that comprises parameters (e.g., action points on which the policy operates) needed to execute the polis icy, whereas a job is an executable entity or an executing instance of the task. In other words, a policy is defined as the taking of some action in response to the occurrence of some condition, e.g., "if X then Y". Note that the condition may comprise a scheduling event or a monitoring event. A task, therefore, is a policy plus a schedule and a job is an instance of a task.

For example, assume a user wants to create new physical storage as a share and further wants to attach the share to a link point of the logical namespace. Assume also that the physical storage is resident on a particular unit of storage (such as a qtree) of a filer and that the user wants to replicate (mirror) the share to another filer. The process of creating the storage on the qtree, exposing the storage as a share, attaching the share to a link point and mirroring the share can be performed as a policy on the NSM server. According to an aspect of the invention, the integration between namespace and storage management is leveraged through the policy architecture.

Notably, each entity of the policy architecture is independent of the other, which allows increased flexibility and efficiency among tasks and jobs. Moreover, the independent entity architecture is advantageous with respect to minor changes to a policy, which content typically comprises more information than a task or job. Instead of creating a new policy to accommodate a minor change, the novel policy architecture of the present invention necessitates only modification to the task (or job) associated with the policy. In contrast, a policy used in previous systems is the entity that is executed and, as such, must be changed (or a new policy created) to accommodate any minor change, which may result in substantial consumption of resources.

Since there are many such properties that may be executed on the NSM server, the present invention enables the user to create and define a policy using an offline temp) plate at the NSM console, wherein the behavior of the property is specified and stored as a policy. The offline template is implemented by the console via a graphical user interface (GUI) "policy-creation wizard". Broadly stated, the policy-creation wizard leads the user through various screens, prompting the user to select behaviors for related attributes and properties.

Figure 4:
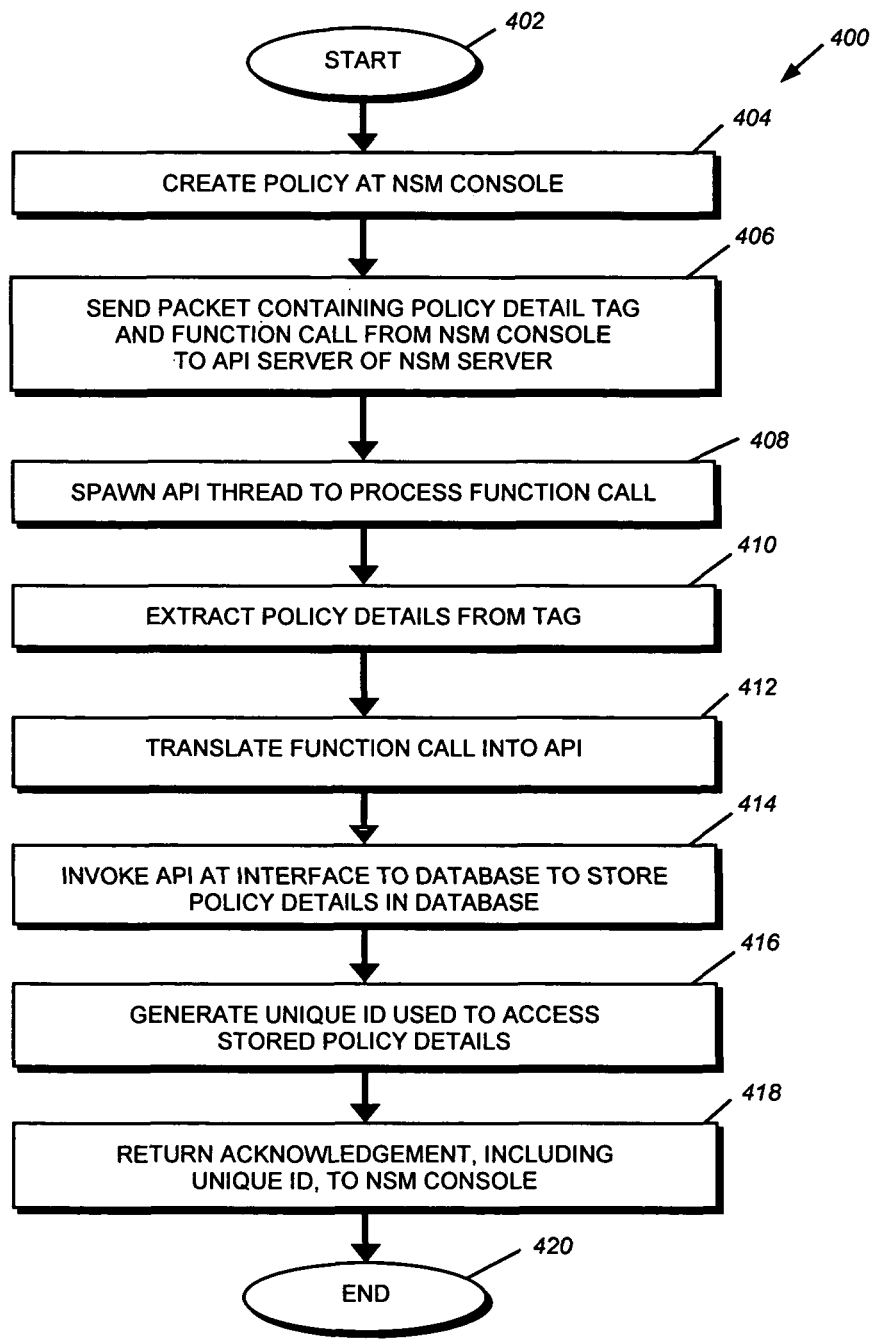
FIG. 4 is a flowchart illustrating a procedure for creating and storing a policy in accordance with a policy architecture of the integrated management framework of the present invention.

FIG. 4 is a flowchart illustrating a procedure for creating and storing a policy in accordance with the policy architecture of the integrated management framework of the present invention. The procedure 400 starts at Step 402 and proceeds to Step 404 where a user (e.g., a system administrator) creates a policy by, e.g., selecting appropriate attribute and property parameters at a GUI wizard of the NSM console. A unique name is assigned to the policy upon creation by the user. The parameters, are then sent from the NSM console 150 to the NSM server 200 in XML tag format using the communication protocol, where the server stores the entire set as a policy on the embedded database 370.

Specifically, in Step 406, the NSM console sends a packet containing one or more function calls associated with one or more XML policy detail tags to the NSM server, where they are received by the API server. In Step 408, the API server spawns an API server thread to process the function call. In Step 410, an XML parser within the API server extracts the policy details (properties and attributes) from each XML tag and provides them to the API thread, which translates the call into one or more specific actions that take place within the NSM server. To that end, the thread interfaces with the NSM library 380 and, in particular, to one of the NSM library modules, each of which may be linked to different process within the NSM server. Accordingly, an NSM library module is linked into the API server thread such that delegation of logic used to perform the translated actions occurs within the context of the API server 310.

For example, in Step 412, the API server thread cooperates with a library module of the NSM library to translate the function call received from the NSM console into an API that, e.g., stores the policy details (associated properties and/or attributes) in the embedded database 370. Note that one or more tables of the database may be configured to store policies and their associated details (properties and attributes). Alternatively, the function call may be translated into an API that initiates action by the remote agent. Other examples of actions provided by the translated APIs may include updating the tables of the embedded database 370 with new data, validating access to the data, and/or retrieving the data when access has been validated.

When cooperating with the NSM library to store data into the database 370, the API server thread invokes an API at the DBI 360 at Step 414. The API invoked by the API thread is illustratively embodied as a SQL function call into the embedded database 370 that stores: (i) information and parameters (details) relating to the policy created by the user or, alternatively, (ii) information retrieved by the NSM server in response to discovery operations performed by the remote agent. In the former case, the API server thread receives XML tags, parses them and cooperates with the NSM library to invoke appropriate SQL APIs to, e.g., store the information and parameters of the policy in the database 370 via the DBI 360. Alternatively, the thread may cooperate with the NSM library 380 to invoke APIs that are embodied as API function calls to the remote agent that instructs the agent to perform specific actions on the machine hosting that agent.

Upon storing the properties and attributes of the policy in the appropriate table of the database 370, the DBI 360 generates a unique identifier (ID) that is associated with the stored policy (and details) in Step 416. The unique name and ID are thereafter used to query the database to access the stored policy. In Step 418, the NSM server returns an acknowledgement, including the unique ID associated with the unique name of the policy, to the NSM console for use by the user. When subsequently accessing the policy at the NSM server, the user provides the unique name of the policy, which is translated at the DBI to the unique ID to thereby enable access to the policy in the database 370. The SQL function call (command) specifies the location (table/entry) and format of the data for storage in the database. The procedure then ends at Step 420.

Notably, the integrated namespace and storage management service provided by the framework 300 is primarily realized within the embedded database 370. In other words, a pre-existing schema of the underlying storage management technology employed by the NSM server 200 is configured to perform storage management actions, such as monitoring volumes, filers, etc. For example, assume the NSM server 200 executes a storage management policy that specifies "find all agents in a particular subnetwork of the storage system environment", wherein the subnetwork (subnet) includes a plurality of DFS servers. The NSM console invokes an API on the API server that requests discovery of agents in the subnet. The API server updates the database schema so that when the Monitor polls the database, it notices that the schema has changed to request discovery of agents in the subnet. The Monitor (and Discovery daemon) then instructs the remote agent to poll all IP addresses of machines hosting agents in that subnet.

Another example of a storage management policy involves discovery of storage objects, such as host machines, file servers and/or filers. Assume that operating system versions of filers are organized into different groups. A storage management policy may specify discovery of all filers in the storage system environment 100 and, upon discovery, examination of their operating system versions. Thereafter, the policy may specify organization of each storage operating system version of each filer into a corresponding group. Illustratively, there may be separate tables within the embedded database 370 for namespace and storage management functions (although this is not a requirement and other optimized database table arrangements are possible).

According to the invention, this pre-existing schema is extended to include namespace actions such as, e.g., discovery and population of pathname information into the logical namespace, as described further herein. This aspect of the present invention is advantageous because it enables integration of storage management, i.e., the function of managing individual storage objects, with namespace (data) management, i.e., the function of managing individual namespace objects, to thereby improve the performance and availability of the service. Because these management functions are integrated, certain cooperative actions may be performed that otherwise could not. For instance, consider a storage administrator that is primarily concerned with whether a file server and its associated storage are operational, and a data administrator that is primarily concerned with whether the data on the storage of the server is accessible. Using the teachings of the present invention, a single administrator can employ the integrated management framework to initiate actions that ensure the availability of the data on some reliable storage in the environment.

Once the policy is created, the user can create a task associated with the created policy using a GUI "task-creation wizard" of the NSM console. Note that, in general, a task may be associated with one or more parameters, such as source and destination machines (e.g., in the case of data migration). However, in the illustrative embodiment described herein, a task is associated with a schedule (provided by the scheduler 320); therefore, one of the screens of the task-creation wizard requests a schedule as to the frequency at which the user wants the task to run as a job, e.g., everyday, once a week, etc. That is, during creation of the task, the user specifies the schedule at which the task should be executed. Such schedule details of the policy are stored in the database and a module of the NSM library (e.g., the namespace library module) interacts with the scheduler to ensure that a new job of the task is created and executed as specified by the schedule details.

Figure 5:
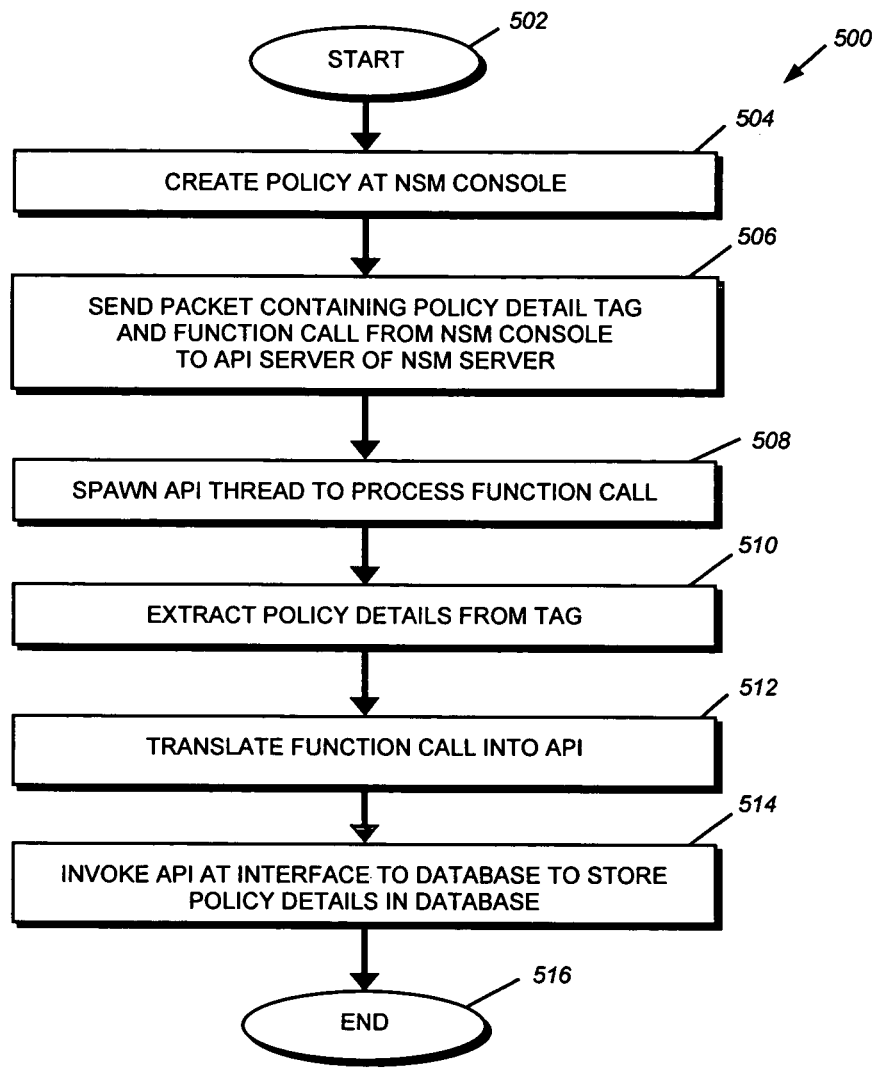
FIG. 5 is a flowchart illustrating a procedure for creating and scheduling a task in accordance with the policy architecture of the integrated management framework of the present invention.

FIG. 5 is a flowchart illustrating a procedure for creating and scheduling a task in accordance with the policy architecture the integrated management framework of the present invention. Assume a namespace auto-population policy is created that involves discovery and population of the logical namespace at the NSM server. The procedure 500 starts at Step 502 and proceeds to Step 504 where a user (system administrator) creates a task of the auto-population policy using the task-creation wizard of the NSM console 150 and, in Step 506, forwards that task as one or more XML task detail tags (and one or more associated function calls) within a packet to the API server 310. Upon receiving the function call, the API server 310 spawns an API server thread to process the call in Step 508. In Step 510, the XML parser within the API server extracts the task details from the XML tag and provides them to the API thread that, in Step 512, translates the call into one or more specific APIs for execution within the NSM server. As noted, the API server thread interfaces with the NSM library 380 and, in Step 514, cooperates with an appropriate module of the library to invoke the API that registers (i.e., schedules) the task with the scheduler 320. The procedure then ends at Step 516.

The policy architecture (e.g., policy, task and job) provides flexibility of creating tasks of different types associated with different policies. Once created, a task can be scheduled for execution at any time (immediately or later). In one embodiment, the scheduler 320 constantly polls the database 370 to determine whether there is a task that needs be run and, if so, initiates execution of the task. The task then executes as a job and the job is monitored in terms of whether the task successfully executes.

Figure 6:
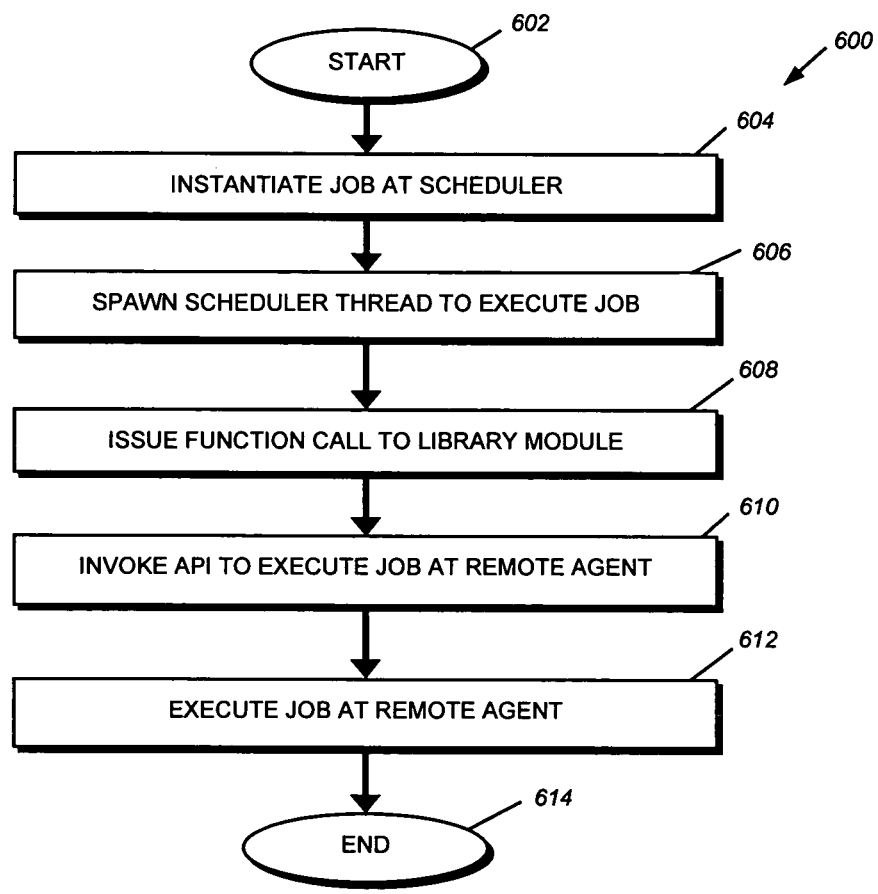
FIG. 6 is a flowchart illustrating a procedure for executing a job in accordance with the policy architecture of the integrated management framework of the present invention.

FIG. 6 is a flowchart illustrating a procedure for executing a job in accordance with the policy architecture of the integrated management framework of the present invention. Assume the job (and task) relates to namespace auto-population. The procedure 600 starts at Step 602 and proceeds to Step 604 where the scheduler 320, when scheduling execution of a task, instantiates the job based on the task and, in Step 606, spawns a thread to execute the job. In Step 608, the scheduler thread issues a function call to a namespace module of the NSM library 380. In Step 610, the namespace library module instantiates the job by invoking an API within a packet for transmission to an appropriate remote agent. The API packet includes a function call instructing the agent to execute the namespace job and implement the rules of the policy by generating appropriate, e.g., Win32, APIs to instruct a namespace server as to discovery of (CIFS) shares that are accessible in the network. For this illustrative namespace auto-population job, the remote agent typically resides on a DFS server in the network. In general, remote agents reside on Windows operating system platforms, however it will be understood to those skilled in the art that the agents could reside on other machines, such as Unix systems. In Step 612, the remote agent uses APIs of the platform on which it resides (e.g., Window APIs) to execute the job by, e.g., retrieving the data (files) from the DFS server and copying them to the NSM server. The procedure then ends at Step 614.

According to the invention, the remote agent is integrated with a novel plug-in module configured to perform one or more independent functions. The plug-in module is embodied as software code that operates within the context of the remote agent process and provides an interface to the host platform. An illustrative example of a plug-in is the namespace plug-in 175 that has the intelligence to communicate with a host machine, such as a namespace server, to manage the logical namespace by, e.g., creating the namespace, creating and/or deleting link points of the namespace, etc. The novel plug-in module provides an interface from the integrated management framework architecture to the architecture of its host machine. To that end, the remote agent comprises an API server that cooperates with an API service on Windows platforms (or a daemon process on Unix platforms) to receive API requests from the NSM server and translate them into host machine calls, such as Win32 APIs and/or Unix system calls.

For namespace auto-population, the namespace plug-in is installed on a host machine that manages the namespace (such as a Windows DFS server or a Unix NIS server) and is configured to create a new link point within the logical namespace. Note that creation of a new link point does not require a policy. That is, creation of a new link point by a user is an immediate action invoked through the wizard or CLI and that does not require a policy or scheduling (i.e., the use of the scheduler).

According to an aspect of the invention, the namespace plug-in has the machinery needed to implement the rules to perform namespace discovery and population. For example, the rules of the namespace policy may specify discovery of CIFS shares in the network to which the DFS server has access and whose names match to a policy-provided expression. Upon discovery of such matching shares, the rules further specify populating the shares as targets into particular link points on the logical namespace. The remote agent then creates the link points and inserts the matching CIFS shares as targets into those link points and then formats the target/link point information into packets for transmission to the NSM server. The information is then stored in the embedded database so that the NSM server can manage the namespace. Specifically, the database is updated by the Discovery daemon 350 of the Monitor 340 running on the NSM server. The Discovery daemon is responsible for discovering information (such as storage entities) and populating the embedded database with that discovered information. To that end, the Discovery daemon 350 cooperates with the remote agent 170 to receive the information and thereafter interact with the NSM library 380 to invoke calls to update the database.

Typically, the Discovery daemon 350 runs on a schedule specified by the user via an option. A typical example of a scheduled discovery function is to probe all host machines (and/or servers) within the network to determine their shares and then communicate with the DFS server 160 to determine the namespace and link points associated with the discovered shares. In addition, the Discovery daemon may be scheduled to search the network by IP address to discover the types of machines that are accessible, i.e., whether the machines at those addresses are filers, DFS servers or whether they have remote agents. The Discovery daemon then populates the embedded database 370 with that discs covered information.

The Monitor 340 examines the database to determine which shares on the machines have been previously discovered and thereafter sends scheduled probes or "pings" (in accordance with global option settings by a user) to these machines to determine whether the shares are accessible. The Monitor then updates the status of each of these machines/shares in the database. In addition, the Monitor 340 may examine the database 370 for entities that have already been discovered and then periodically (or according to a schedule) obtain the status of those discovered entities. For example, assume that a particular namespace has been discovered. The Monitor cooperates with the remote agent 170 to probe entities of the namespace to determine whether there have been any changes since the last time status was obtained or, if no status has been obtained, since the discovery process had run to discover the entities. In response, the remote agent returns a data structure (e.g., a tree) to the Monitor showing the status of the entities in the namespace.

The Monitor 340 thereafter stores the information in the database 370 and determines (monitors) whether there any changes by, e.g., walking the tree. Upon discovering any changes, the Monitor initiates an event that is processed by the Event daemon 330. The Event daemon, in turn, generates an event notification to the user indicating that the namespace has changed. Examples of event notifications generated by the Event daemon (as specified by the user) are email or paging messages. Here, the Event daemon creates an appropriate packet using a network protocol stack of the operating system 225 and forwards the packet over the network adapter 230 of the NSM server to the network.

Alternatively, the initiated event may be processed by the Event daemon and accessed ("pulled") by the NSM console 150, which displays the event on its GUI. For example, assume the Monitor 340 is constantly monitoring the state of an entity via API communication with the remote agent, instructing it to return the status of that particular entity. In response, the remote agent 170 returns the status to the Monitor, which examines the status to determine whether the state of the entity has changed since the last time it was monitored. If so, the Monitor 340 sends a message to the Event daemon 330 indicating that an event has occurred and the Event daemon stores the event into the embedded database 370. Note that the event is stored in a protocol agnostic manner, i.e., the information stored in the protocol specific data structure of the event is extracted so that the stored event information is not in a storage access protocol (e.g., DFS) specific format and thus can be easily adapted to another storage access protocol (e.g., NFS) format. The Event daemon 330 then generates an event notification to the console 150, which pulls the event.

Note that the operations of the Monitor 340 and Discovery daemon 350 may also be affected by policies, e.g., a policy that creates, rather than discovers, a namespace. Assume a user/system administrator creates a new root of the logical namespace on an existing DFS server. The user interacts with the NSM console to provide details of the root to be created on the DFS server. The NSM console forwards the details as an API packet to the API server of the NSM server. The API server then cooperates with the NSM library to generate API requests to the remote agent running on the machine that is hosting the DFS server. Thereafter, the remote agent communicates with the DFS server to create the namespace root and returns a response to the NSM console via the NSM server. Here, neither the Monitor nor the Discovery daemon is involved with this flow at this time; however, since the namespace root has been created, that namespace can be discovered by these processes in a subsequent discovery cycle.

D. Group-Based Namespace Management

In accordance with another aspect of the invention, the integrated management framework 300 extends a concept of grouping as implemented by the underlying storage management processes and directed to managed storage objects (e.g., volumes, files and filers). To that end, the extended concept of grouping in the integrated management framework is directed to a set of managed namespace objects including, e.g., remote agents, shares (e.g., CIFS shares), namespaces, namespace servers. The managed objects of a set (group) may share one or more characteristics that facilitate execution of one or more operations on the group as a whole. Thus, a set of CIFS shares may be organized as a group and a policy, such as a data protection or data migration policy, may be applied to the group of CIFS shares, wherein each CIFS share group member is automatically affected by the policy. Note that processes of the integrated management framework 300 used to implement grouping may include, among others, the NSM console 150 (e.g., an NSM console application), the CLI 315, the API server 310, the NSM library 380 and the database 370.

Figure 7:
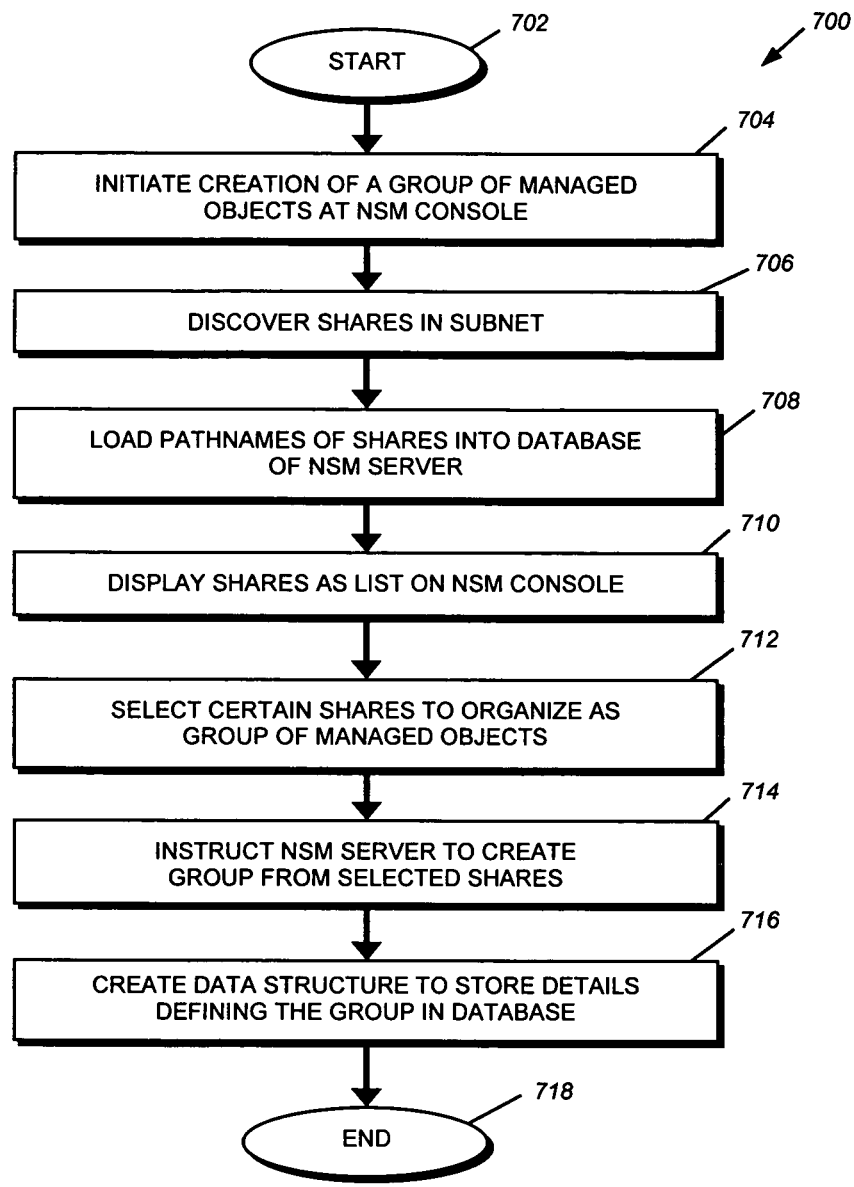
FIG. 7 is a flowchart illustrating a procedure for creating a group of managed objects in accordance with the present invention.

FIG. 7 is a flowchart illustrating a procedure for creating a group of managed objects in accordance with the present invention. The procedure 700 starts at Step 702 and proceeds to Step 704 where the NSM console, in response to an administrator request, initiates creation of the group by, e.g., issuing an API call to the API server that instructs the NSM server to fetch (collect) all available CIFS shares in a subnet. In Step 706, the NSM server cooperates with one or more remote agents to discover the shares and, in Step 708, load their pathnames into the database. In Step 710, the NSM server interacts with the NSM console to display those shares as a list to the administrator, e.g., via a browser. The administrator may thereafter select certain of the shares and, in Step 712, instruct the console to organize them as a group with a specified name. As noted, the administrator may organize the shares as a set of managed objects according to, e.g., certain characteristics.

In response, the NSM console invokes an API call on the API server, instructing the NSM server to create the group from the selected CIFS shares (Step 714). The API server then forwards a create group function call to a library module of the NSM library that is delegated the responsibility of handling the call. In Step 716, the library module interacts with the database, e.g., to create a data structure, such as a table, for storing the details defining the group. Illustratively, the table is created wherein each entry has a list of CIFS shares (members) that belong to a particular group having a particular name. The table is illustratively labeled "groups" and the multiple entries of the table are indexed by group name. In addition, there may be pointers or references to the particular to CIFS shares that belong to the group. The procedure then ends at Step 718.

Figure 8:
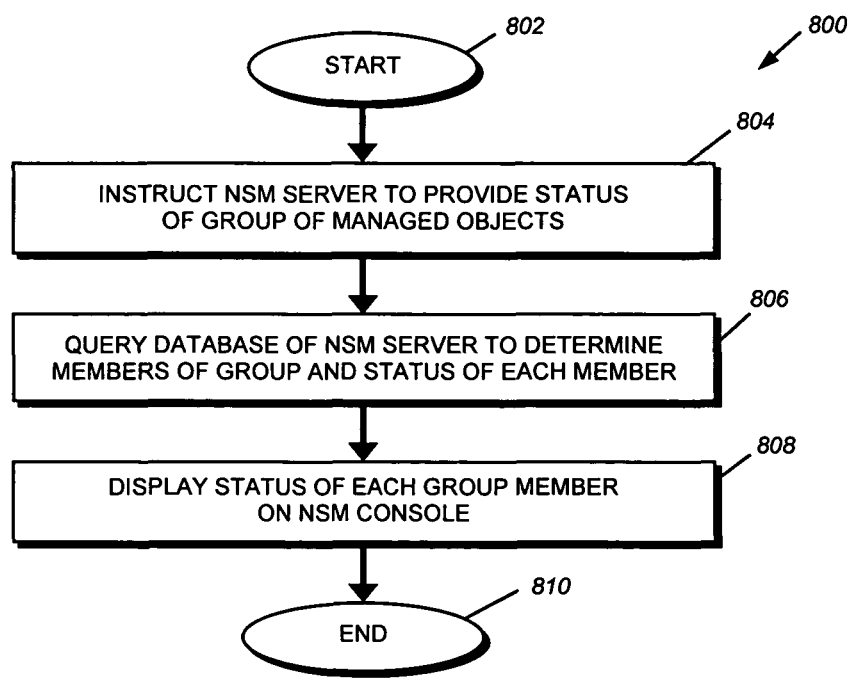
FIG. 8 is a flowchart illustrating a procedure for enabling an administrator to monitor the status of a created group of managed objects in accordance with the present invention.

Once a group is formed, the integrated management framework 300 enables performance of certain operations at the group level. Such operations may include listing of events that have been generated by members of the group, generation of group specific reports and, monitoring of status at the group level. FIG. 8 is a flowchart illustrating a procedure for enabling an administrator to monitor the status of a created group of managed objects in accordance with the present invention. The procedure 800 starts at Step 802 and proceeds to Step 804 where, in response to an administrator request, the NSM console invokes an API call on the API server that instructs the NSM server to provide the status of the created group. The API server delegates the call to an appropriate NSM library module which, in Step 806, queries the database to (i) determine the members of the group and (ii) the status of each member. Note that, in the illustrative embodiment, the Monitor records the status of each share in a separate status table of the database. Accordingly, each entry of the group's table may include links or references from each individual CIFS share to an entry of the status table that stores the current status of that share. In Step 808, the NSM server interacts with the NSM console to display the status of each group member to the administrator, e.g., via a browser. The procedure then ends at Step 810.

Notably, this aspect of the invention defines a novel set of managed objects (remote agents, shares, namespaces, namespace servers) that is different from the set of managed objects defined by the underlying storage management technology. These managed objects have their own properties, such as the types of operations that can be performed on the objects, the types of attributes that describe the managed objects, and the types of status that can be associated with the managed objects. Advantageously, the grouping of the novel managed objects allows an administrator to perform an operation on multiple objects at the same time instead of having to access each of those objects individually. This grouping aspect of the invention extends the infrastructure of the underlying storage management technology to include namespace managed objects to thereby enable a more efficient user friendly namespace and storage management tool. That is, the integrated management framework 300 enables grouping of both storage managed objects (e.g., volumes, files and filers) as well as namespace managed objects (shares, remote agents and namespaces).

In sum, the invention extends the functions of the underlying storage management coordinating processes to provide the novel integrated management framework architecture described herein. In one aspect of the invention, the functions of these processes are extended to provide a policy architecture comprising policy, tasks and jobs. This inventive aspect involves the manner in which (i) policies are created, (ii) jobs and tasks are created (and spawned) from a policy and (iii) the integrated management framework architecture, including the NSM server, executes and implements the policy, task and job to provide an integrated namespace and storage management function. In another aspect of the invention, the functions of the processes are extended to provide a group of managed namespace objects that may share one or more characteristics that facilitate execution of operations on the group as a whole.

While there has been shown and described an illustrative embodiment of a system and method for integrating namespace management and storage management in a storage system environment, it is to be understood that various other adaptations and modifications may be made within the spirit and scope of the invention. For example, in an alternate embodiment of the invention, the remote agent 170 may be installed on a machine that hosts a Name Information Service (NIS) with AutoMounter maps of a NFS environment. The NIS service generally functions as a repository for storing, inter alia, user identities, names and distributed objects, for use by a client. The remote agent and namespace management plug-in module are installed on a NIS server (configured to manage a NFS namespace) and the NSM server 200 invokes APIs on the agent 170 to manipulate the AutoMounter maps.

In yet another alternate embodiment, the remote agent 170 may be installed on a machine that hosts a volume location database (VLDB) in a distributed storage system architecture of a node cluster available from Network Appliance, Inc., Sunnyvale, Calif. Here, the remote agent and namespace management plug-in module are installed on an M host of the cluster and the NSM server 200 invokes APIs on the agent 170 to manipulate a distributed system namespace, which may further extend across one or more clusters with heterogeneous servers.

The foregoing description has been directed to specific embodiments of this invention. It will be apparent, however, that other variations and modifications may be made to the described embodiments, with the attainment of some or all of their advantages. For instance, it is expressly contemplated that the procedures, processes and/or modules described herein may be implemented in hardware, software, embodied as a computer-readable medium having program instructions, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A system configured to integrate namespace management and storage management in a storage system environment, the system comprising:
  a namespace and storage management (NSM) console including a user interface; a remote agent installed on a host machine including units of storage;
  a NSM server cooperating with the NSM console and remote agent to create an integrated management framework that provides an underlying infrastructure that supports various heterogeneous storage access protocols within a logical namespace service provided by the NSM server, the logical namespace service further enabling integration of the storage management with the namespace management through the NSM server to thereby improve the performance and availability of the service;
  the integrated management framework configured to extract pathnames from namespaces exported by heterogeneous namespace services and to configure the extracted pathnames to be accessible in the logical namespace service via at least one of the various heterogeneous storage access protocols, the integrated management framework executing a discovery daemon configured to execute a discovery function to determine namespace and link point information associated with the units of storage discovered on the host machine, the discovery daemon further configured to populate a database of the integrated management framework with the namespace and link point information associated with the discovered units of storage;
  a policy architecture configured to integrate the storage management with the namespace management utilizing a policy, a task, and a job, wherein the policy is a first static entity including rules for performing a specific action, wherein the task is a second static entity that includes parameters needed to execute the policy, wherein the job is an executable entity of the task configured to implement the rules of the policy, and the policy architecture is further configured to change a policy by only modifying the task or the job without creation of a new policy, where a plurality of management objects sharing one or more characteristics is grouped together to form a group of managed objects, and the policy architecture is further configured to apply a particular policy to the group of managed objects, wherein the policy architecture includes an offline template at the NSM console coupled to the NSM server, the offline template utilized to create and define the policy; and
  an application program interface (API) server configured to cooperate with an NSM library of the integrated management framework to translate function calls received from the NSM console after creation of the particular policy into an API that stores details associated with the particular policy applied to the group of managed objects in the database of the integrated management framework.

2. The system of claim 1 wherein the storage management comprises a function of managing individual storage objects.

3. The system of claim 1 wherein the namespace management comprises a function of managing individual namespace objects.

4. The system of claim 1 wherein the integrated management framework facilitates configuration and management of pathnames in a logical namespace.

5. The system of claim 4 wherein the integrated management framework presents to a client a notion of the logical namespace that is accessible via a storage access protocol of the various heterogonous storage access protocols.

6. The system of claim 1 wherein the extracted pathnames are configured to be stored in the database, and wherein the extracted pathnames are accessible in the logical namespace via a storage access protocol of the various heterogonous storage access protocols.

7. The system of claim 1 wherein the logical namespace service is based on extensions to storage management processes embodied as library functionality directed to the namespace and remote agent management.

8. The system of claim 7 wherein the storage management processes are further extended to provide the policy architecture directed to integrating the namespace management and the storage management in the logical namespace.

9. The system of claim 8 wherein the specific action is configuration of the extracted pathnames in the logical namespace.

10. The system of claim 1 wherein each entity of the policy architecture is independent of the other, thereby allowing flexibility and efficiency among tasks and jobs.

11. The system of claim 1 further comprising a plug-in module installed in the remote agent, the plug-in module allowing remote access and management of data by the NSM server.

12. The system of claim 11 wherein the plug-in module provides an interface from an architecture of the integrated management framework to an architecture of the host machine.

13. The system of claim 12 wherein the plug-in module is a namespace plugin module.

14. A method for integrating namespace management and storage management in a storage system environment, the method comprising:
  creating an integrated management framework, on a processor of a computer system, that provides an underlying infrastructure that supports various heterogeneous storage access protocols within a logical namespace;
  extracting pathnames from namespaces exported by heterogeneous namespace services;
  storing the pathnames on a namespace and storage management (NSM) server;
  configuring the pathnames so that they are accessible in the logical namespace via a storage access protocol of the various heterogeneous storage access protocols;
  extending storage management processes through the NSM server to provide a policy architecture directed to an ability to integrate namespace management and storage management in the logical namespace through the NSM server, wherein the policy architecture includes a policy, a task, and a job, wherein the policy is a first static entity including rules for performing a specific action, wherein the task is a second static entity that includes parameters and a schedule needed to execute the policy, wherein the job is an executable entity of the task configured to implement the rules of the policy according to the schedule, and the policy architecture is further configured to change a policy by only modifying the task or the job without creation of a new policy, wherein the policy architecture includes an offline template at the NSM console coupled to the NSM server, the offline template utilized to create and define the particular policy;

grouping a plurality of managed objects together to form a group of managed objects, wherein the group of managed objects share one or more characteristics;

utilizing the policy architecture to apply a particular policy to the group of managed objects;

cooperating between an application program interface (API) server and a NSM library of the integrated management framework to translate function calls received from a NSM console after creation of the particular policy into an API that stores details associated with the particular policy in a database of the integrated management framework; and executing, by the integrated management framework, a discovery daemon that implements a discovery function to determine namespace and link point information associated with units of storage discovered on a host machine coupled to the integrated management framework, the discovery daemon populating the database with the namespace and link point information associated with the discovered units of storage.

15. The method of claim 14 wherein the extended storage management processes include library functionality directed to namespace management to thereby create the integrated management framework.

16. The method of claim 14 wherein the group of managed objects include one of remote agents, shares, namespaces and namespace servers.

17. Apparatus configured to integrate namespace management and storage management in a storage system environment, the apparatus comprising:
means for creating an integrated management framework that provides an underlying infrastructure that supports various heterogeneous storage access protocols within a logical namespace;
means for extracting pathnames from namespaces exported by heterogeneous namespace services;
means for storing the pathnames on a namespace and storage management (NSM) server including one or more processors and one or more memories;
means for configuring the pathnames so that they are accessible in the logical namespace via the storage access protocol of the various heterogeneous storage access protocols;
means for extending storage management processes through the NSM server to provide a policy architecture directed to an ability to integrate the namespace management and the storage management in the logical namespace through the NSM server, wherein the policy architecture includes a policy, a task, and a job, wherein the policy is a first static entity including rules for performing a specific action, wherein the task is a second static entity that includes parameters needed to execute the policy, wherein the job is an executable entity of the task configured to implement the rules of the policy, and the policy architecture is further configured to change a policy by only modifying the task or the job without creation of a new policy, where a plurality of management objects sharing one or more characteristics are grouped together to form a group of managed objects and the policy architecture applies a particular policy to the group of managed objects, wherein the policy architecture includes an offline template at the NSM console coupled to the NSM server, the offline template utilized to create and define the particular policy;

cooperating, between an application program interface (API) server and an NSM library of the integrated management framework to translate function calls received from a NSM console after creation of the particular policy into an API that stores details associated with the particular policy applied to the group of managed objects in a database of the integrated management framework; and means for executing a discovery daemon that implements a discovery function to determine namespace and link point information associated with units of storage discovered on a host machine coupled to the integrated management framework, the discovery daemon populating the database with the namespace and link point information associated with the discovered units of storage.

18. The apparatus of claim 17 further comprising means for extending storage management processes executing on the NSM server to include library functionality directed to namespace management to thereby create the integrated management framework.

19. A computer readable medium containing executable program instructions executed by a processor, comprising:
program instructions that create an integrated management framework that provides an underlying infrastructure that supports various heterogeneous storage access protocols within a logical namespace;
program instructions that extract pathnames from namespaces exported by heterogeneous namespace services;
program instructions that store the pathnames on a namespace and storage management (NSM) server including one or more processors and one or more memories;
program instructions that configure the pathnames so that they are accessible in the logical namespace via a storage access protocol of the various heterogeneous storage access protocols;
program instructions that extend storage management processes through the NSM is server to provide a policy architecture directed to an ability to integrate namespace management and storage management in the logical namespace through the NSM server, wherein the policy architecture includes a policy, a task, and a job, wherein the policy is first a static entity including rules for performing a specific action, wherein the task is a second static entity that includes parameters needed to execute the policy, wherein the job is an executable entity of the task configured to implement the rules of the policy, and the policy architecture is further configured to change a policy by only modifying the task or the job without creation of a new policy, where a plurality of management objects sharing one or more characteristics are grouped together to form a group of managed objects and the policy architecture is further configured to apply a particular policy to the group of managed objects, wherein the policy architecture includes an offline template at the NSM console coupled to the NSM server, the offline template utilized to create and define the particular policy;

program instructions that facilitate cooperation between an application program interface (API) server and an NSM library of the integrated management framework to translate function calls received from a NSM console after creation of the particular policy into an API that stores details associated with the particular policy applied to the group of managed objects in a database of the integrated management framework; and program instructions that execute a discovery daemon that implements a discovery function to determine namespace and link point information associated with units of storage discovered on a host machine coupled to the integrated management framework, the discovery daemon populating the database with the namespace and link point information associated with the discovered units of storage.

20. The computer readable medium of claim 19 further comprising one or more program instructions for extending storage management processes executing on the NSM server to include library functionality directed to namespace management to thereby provide the integrated management framework.

21. The method of claim 14 further comprising:

in response to storing the details, generating a unique identifier associated with the particular policy;

utilizing the unique identifier to query the database to access the policy.

\* \* \* \* \*